United States Patent
Knox et al.

[11] Patent Number: 6,118,494
[45] Date of Patent: Sep. 12, 2000

[54] APPARATUS AND METHOD FOR GENERATING ON-SCREEN-DISPLAY MESSAGES USING TRUE COLOR MODE

[75] Inventors: Michael Dwayne Knox, Fishers; Michael Scott Deiss, Zionsville, both of Ind.

[73] Assignee: Thomson Licensing S.A., Boulogne Cedex, France

[21] Appl. No.: 09/147,907
[22] PCT Filed: Oct. 16, 1996
[86] PCT No.: PCT/US96/16503
  § 371 Date: Mar. 23, 1999
  § 102(e) Date: Mar. 23, 1999
[87] PCT Pub. No.: WO98/17066
  PCT Pub. Date: Apr. 23, 1998
[51] Int. Cl.[7] .............. H04N 9/64; H04N 5/445
[52] U.S. Cl. .............. 348/569; 348/589; 348/600
[58] Field of Search ...................... 348/569, 589, 348/600; H04N 9/64, 5/445

Primary Examiner—Sherrie Hsia
Attorney, Agent, or Firm—Joseph S. Triploi; Paul P. Kiel

[57] ABSTRACT

An apparatus and concomitant method for generating an OSD message by constructing an OSD bitstream defining a plurality of "true color" pixels. The OSD bitstream contains an OSD header and OSD data. An OSD unit retrieves pixel control information from the OSD header which is programmed by a processor of a decoding/displaying system. The OSD header contains information that is used to program a color palette of the OSD unit and to provide instructions as to the treatment of the OSD data. If the "True Color Mode" is enabled in the OSD header, then the OSD unit will bypass the palette and treat the OSD data as true color pixels. Since the same chrominance components are shared between a pair of successive pixels, each successive set of four OSD data bytes represents the actual chrominance and luminance levels for two OSD pixels.

17 Claims, 3 Drawing Sheets

APPARATUS AND METHOD FOR GENERATING ON-SCREEN-DISPLAY MESSAGES USING TRUE COLOR MODE

FIELD OF THE INVENTION

The present invention relates to a method and apparatus for generating On-Screen-Display (OSD) messages using a "true color mode". More particularly, this invention relates to a method and apparatus that increases the number of available colors by treating the OSD data as true color pixels instead of pointers to the entries of an OSD palette.

BACKGROUND OF THE INVENTION

On-Screen-Display messages play an important role in consumer electronics products by providing users with interactive information such as menus to guide them through the usage and configuration of the product. Other important features of OSD include the ability to provide Closed Captioning and the display of channel logos.

However, the changing standard of digital video technology presents an ever increasing problem of generating and displaying OSD messages. For example, there are specific High Definition Television (HDTV) requirements that an HDTV must display up to 216 characters in four (4) "windows" versus the current National Television Systems Committee (NTSC) requirements of a maximum of 128 characters in one "window". These new requirements place severe strains on the decoding/displaying system used to decode and display television signals (e.g., HDTV, NTSC, MPEG, and the like), which must decode the incoming encoded data streams and present the decoded data to a display system with minimal delays. Since OSD messages must be displayed (overlaid) with the video data, the microprocessor of the decoding/displaying system must assign a portion of the memory bandwidth to perform OSD functions, thereby increasing the memory bandwidth requirements of a decoding/displaying system and the overall computational overhead.

Thus, an OSD unit of a decoding/displaying system may incorporate a limited size palette to minimize hardware requirements and memory access. Namely, the OSD unit employs a palette using a plurality of registers (entries), where each entry contains a representation of chrominance and luminance levels for an OSD pixel. By encoding the addresses (indices) to the palette as OSD data, a decoding/displaying system is able to minimize memory access and hardware requirements.

However, such systems are limited in the number of colors that are available for the display of an OSD message. Since the palette has a fixed size, it is not well suited to changing standards that may require support for an increased number of colors at a later time. For example, to increase the number of colors from 16 to 256 (standard VGA), would require that 240 additional registers be added to a palette that currently supports only 16 entries.

Increasing the number of registers to the palette is certainly possible, but it is not cost effective and may introduce timing problems (especially for high palette access rate) and other integrated circuit (IC) design problems (e.g., increasing the area on an IC). Furthermore, updating an existing decoding/displaying system with a fixed size palette is difficult and expensive.

Thus, a need exists for a method and apparatus for increasing the number of available colors for OSD messages without increasing the hardware requirements, e.g., the size of an OSD palette, of a decoding/displaying system.

SUMMARY OF THE INVENTION

The invention concerns an apparatus and concomitant method for generating OSD messages by constructing a valid OSD bitstream having a plurality "true color" pixels.

More specifically, in accordance with the invention, an OSD unit retrieves an OSD bitstream from a storage device. The OSD bitstream contains an OSD header and OSD data. The OSD header contains control information that is used to program a color palette of the OSD unit and to provide instructions as to the treatment of the OSD data. The control information is programmed by a processor of a decoding/displaying system. If the "True Color Mode" is enabled in the OSD header, then the OSD unit bypasses the palette and treats the OSD data as true color pixels. Namely, each successive set of three OSD data bytes represents the actual chrominance and luminance levels for an OSD pixel.

To further reduce memory bandwidth requirements, the same chrominance components are repeated for the next pixel. Thus, effectively, each OSD pixel is represented by only 16 bits of data.

These and other aspects of the invention will be described with respect to the accompanying drawings.

DETAILED DESCRIPTION OF THE DRAWINGS

Figure 1:
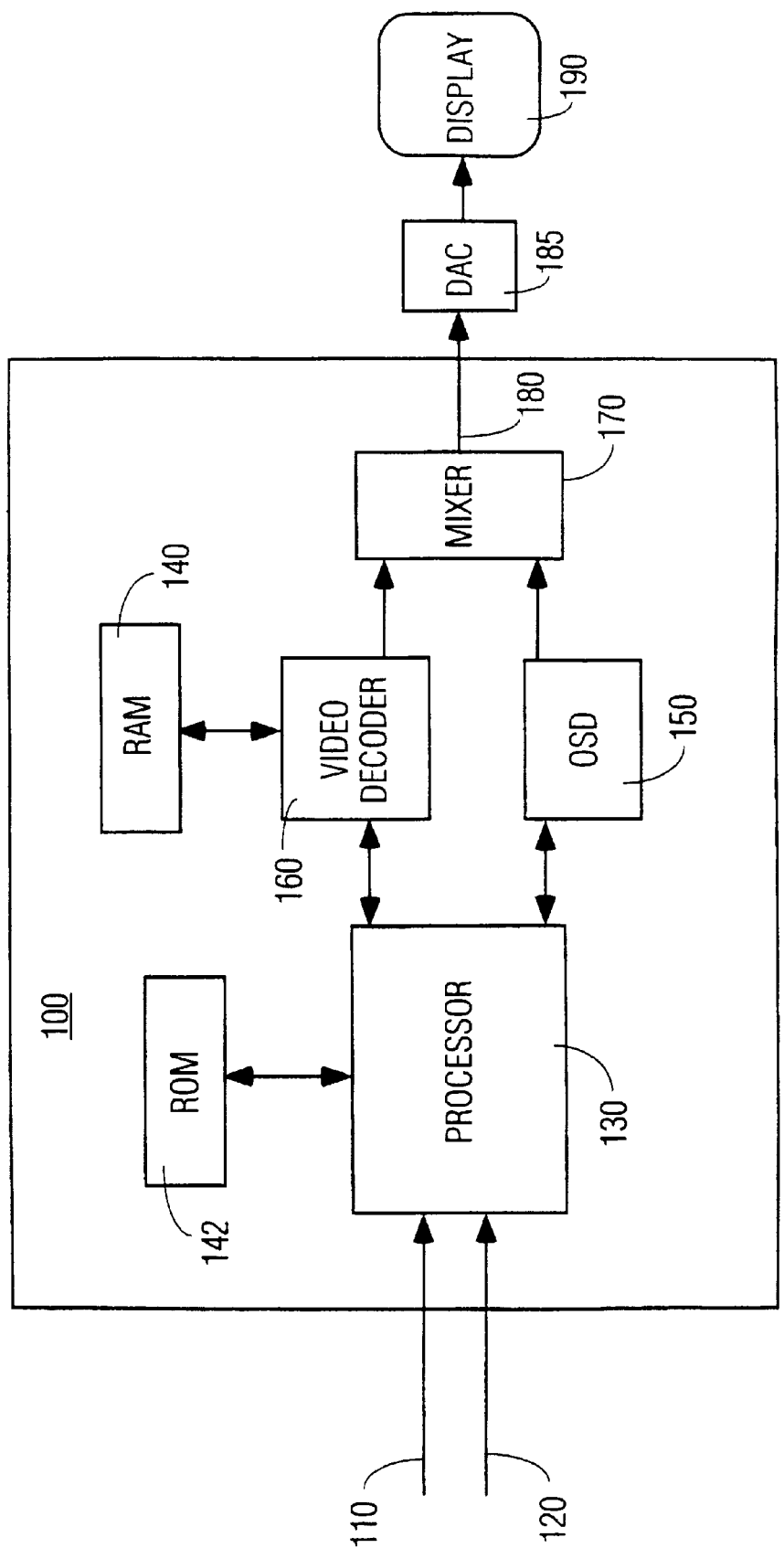
FIG. 1 is a block diagram of a decoding/displaying system including an OSD unit in accordance with an aspect of the invention.

FIG. 1 illustrates a block diagram of a decoding/displaying system for television signals 100 (hereinafter decoding system). The decoding system comprises a processor 130, a random access memory (RAM) 140, a read-only memory (ROM) 142, an OSD unit 150, a video decoder 160, and a mixer 170. The output of the mixer 170 is coupled to a display device 190 via path 180.

The present invention is described below in accordance with the MPEG standards, ISO/IEC international Standards 11172 (1991) (generally referred to as MPEG-1 format) and 13818 (1995) (generally referred to as MPEG-2 format). However, those skilled in the art will realize that the present invention can be applied or adapted to other decoding systems implementing other encoding/decoding formats.

In the preferred embodiment, the decoding system 100 performs real time audio and video decompression of various data streams (bitstreams) 120. The bitstreams 120 may comprise audio and video elementary streams that are encoded in compliance with the MPEG-1 and MPEG-2 standards. The encoded bitstreams 120 are generated by an encoder (not shown) and are transmitted to the decoding system through a communication channel. The encoded bitstreams contain a coded representation of a plurality of images and may include the audio information associated with those images, e.g., a multimedia data stream. The multimedia source may be a HDTV station, a video disk, a cable television station and the like. In turn, the decoding system 100 decodes the encoded bitstreams to produce a plurality of decoded images for presentation on the display 190 in synchronization with the associated audio information. However, for the purpose of this invention, the audio decoding function of the decoding system 100 is irrelevant and, therefore, not discussed.

More specifically, processor 130 receives bitstreams 120 and bitstreams 110 as inputs. Bitstreams 110 may comprise various control signals or other data streams that are not included in the bitstreams 120. For example, a channel decoder or transport unit (not shown) can be deployed between the transmission channel and the decoding system 100 to effect the parsing and routing of data packets into data streams or control streams.

In the preferred embodiment, processor 130 performs various control functions, including but not limited to, providing control data to the video decoder 160 and OSD unit 150, managing access to the memory and controlling the display of the decoded images. Although the present invention describes a single processor, those skilled in the art will realize that the processor 130 may comprise various dedicated devices to manage specific functions, e.g., a memory controller, a microprocessor interface unit and the like.

Processor 130 receives bitstreams 120 and writes the data packets into the memory 140 via video decoder 160. The bitstreams may optionally pass through a First-In-First-Out (FIFO) buffer (not shown) before being transferred via a memory data bus to the memory. Furthermore, there is generally another memory (not shown) which is used solely by the processor 130.

The memory 140 is used to store a plurality of data including compressed data, decoded images and the OSD bit map. As such, the memory is generally mapped into various buffers, e.g., a bit buffer for storing compressed data, an OSD buffer for storing the OSD bit map, various frame buffers for storing frames of images and a display buffer for storing decoded images.

In accordance with the MPEG standards, the video decoder 160 decodes the compressed data in the memory 140 to reconstruct the encoded images in the memory. In some cases, the decoded image is a difference signal that is added to a stored reference image to produce the actual image in accordance with the compression technique used to encode the image (e.g., to facilitate decoding a motion compensated image). Once an image is reconstructed, it is stored in the display buffer pending display via the mixer 170.

Similarly, the OSD unit 150 uses the memory 140 to store the OSD bit map or the OSD specification. The OSD unit allows a user (manufacturer) to define a bit map for each field which can be superimposed on the decoded image. The OSD bit map may contain information which is stored in a storage device, e.g., a ROM, concerning the configuration and options of a particular consumer electronics product. Alternatively, the OSD bit map may contain information relating to Closed Captioning and channel logos that are transmitted from a cable television, a video disk and the like. An OSD bit map is defined as a set of regions (generally in rectangular shapes) of programmable position and size, each of which has a unique palette of available colors.

The OSD bit map is written into the OSD buffer of the memory 140 which is assigned for this purpose by the user. However, those skilled in the art will realize that a ROM 142 or other equivalent storage devices can also serve this function as well.

When the OSD function is enabled for a particular image or frame, the processor 130 manipulates the data in memory 140 to construct an OSD bitstream. The OSD bitstream contains an OSD header and OSD data (data defining the OSD pixels).

More specifically, the processor 130 programs (formats and stores) the OSD header in the memory 140. The OSD header contains information concerning the locations of the top and bottom OSD field bit maps, palette data, pointer to the next header block and various display modes involving OSD resolution, color and compression. Once the OSD header is programmed, the processor 130 may manipulate the OSD data in the memory 140 in accordance with a particular implementation. For example, the OSD data is formatted in accordance with a selected mode, e.g., the True Color Mode as discussed below. Alternatively, the processor may simply program the OSD header with pointers to the OSD data in the memory, where the stored OSD data is retrieved without modification to form the OSD bitstream.

The processor 130 then reports the enable status, e.g., OSD active, to the OSD unit 150, which responds by requesting the processor 130 for access to the OSD bitstream stored within the memory 140. The OSD bitstream is formed and retrieved as the OSD unit reads the OSD headers, each followed by its associated OSD data. After receiving the OSD bitstream, the OSD unit processes the OSD pixel data in accordance with the instructions or selected modes in the OSD header. The OSD unit then waits for a pair of display counters (not shown) to attain count values that identifies the correct position on the display for inserting the OSD information. At the correct position, the OSD unit forwards its output to the mixer 170. The output of the OSD unit 150 is a stream or sequence of digital words representing respective luminance and chrominance components of the on screen display. New memory accesses are requested as required to maintain the necessary data flow (OSD bitstream) through the OSD unit to produce a comprehensive OSD display. When the last byte of the OSD pixel data for the current OSD region is read from the memory, the next OSD header is read and the process is repeated up through and including the last OSD region for the current frame.

Those skilled in the art will realize that the order of constructing and retrieving the OSD bitstream as discussed above can be modified. For example, the OSD header can be read from the memory as the processor is formatting the OSD data, or the OSD data can be processed and displayed as OSD messages by the OSD unit without having to retrieve the entire OSD bitstream.

Since OSD pixel data is superimposed on the decoded image, the mixer 170 serves to selectively blend or multiplex the decoded image with the OSD pixel data. Namely, the mixer 170 has the capability to display at each pixel location, an OSD pixel, a pixel of the decoded image or a combination (blended) of both types of pixels. This capability permits the display of Closed Captioning (OSD pixel data only) or the display of transparent channel logos (a combination of both OSD pixels and decoded image pixels) on a decoded image.

Video decoder 160 and OSD unit 150 both form streams or sequences of digital words representing respective luminance and chrominance components. These sequences of video component representative digital words are coupled via mixer 170 to a digital-to-analog converter (DAC) 185. The luminance and chrominance representative digital words are converted to analog luminance and chrominance signals by the respective sections of the DAC.

The OSD unit 150 can be used to display a user defined bit map over any part of the displayable screen, independent of the size and location of the active video area. This bit map can be defined independently for each field and specified as a collection of OSD regions. A region is often a rectangular area specified by its boundary and by a bit map defining its contents. Each region has associated with it a palette defining a plurality of colors (e.g., 4 or 16 colors) which can be used within that region. If required, one of these colors can be transparent, allowing the background to show through as discussed above.

Although the use of a palette provides a substantial saving in computational overhead for low resolution OSD implementations, it fails to provide the necessary display resolution as required for high resolution OSD implementations. For example, the OSD message may need more colors than that are available in the palette, where the available colors are limited to the number of entries (or physical registers) in the palette.

Figure 2:
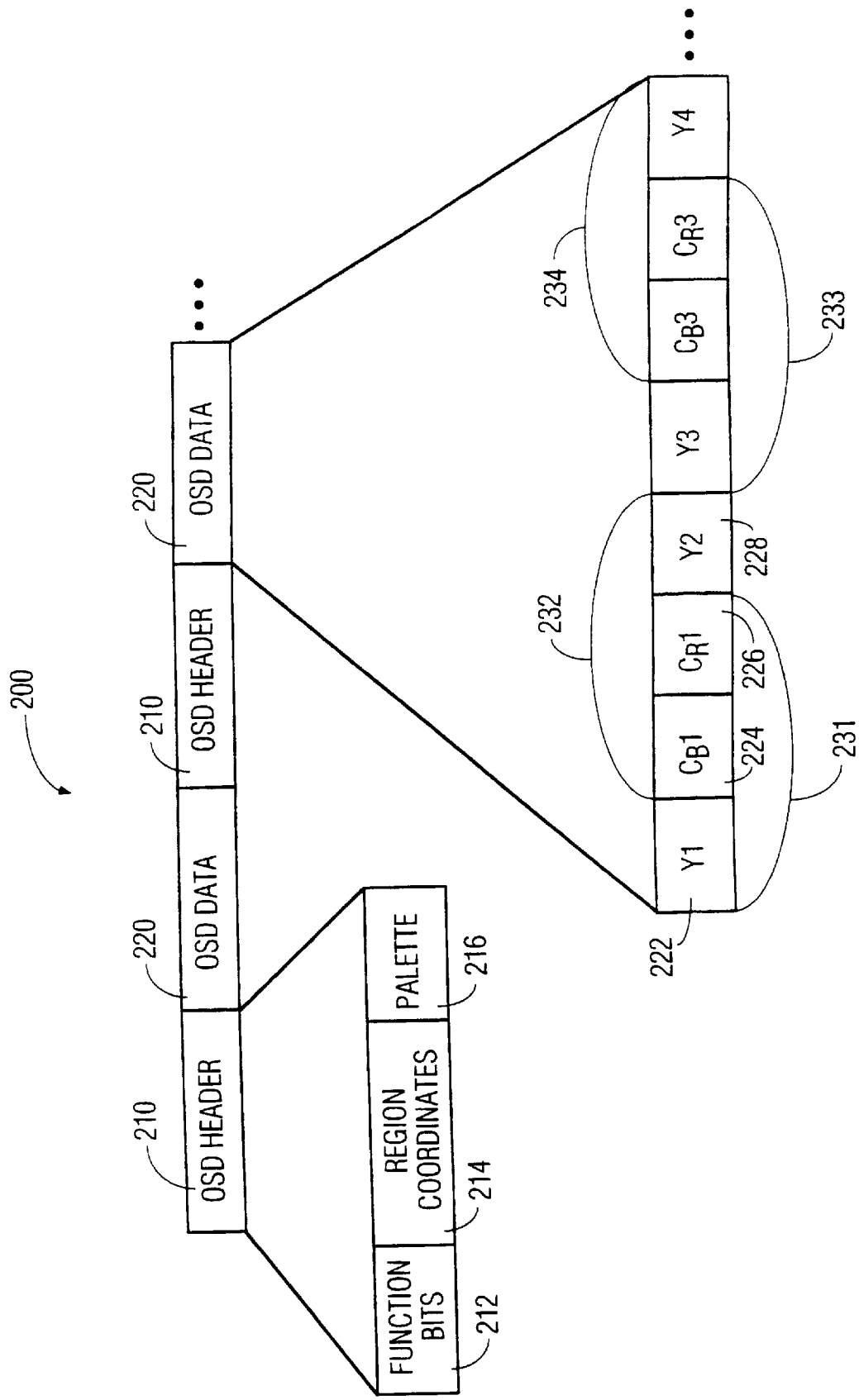
FIG. 2 is a block diagram which discloses the structure of a sample OSD pixel bitstream using true color mode.

FIG. 2 illustrates the structure of a sample OSD bitstream 200 using the true color mode. The OSD bitstream comprises a plurality of OSD headers 210, each followed by OSD data 220. In one embodiment, the header is comprised of five 64-bit words, followed by any number of 64-bit OSD data (bit map) words. The OSD header 210 contains information relating to the OSD region coordinates 214, the various entries of the palette 216 for a particular OSD region, and various function codes (bits) 212. Those skilled in the art will realize that the OSD header can be of any length. A longer header can provide more information and options, e.g., a palette with more entries, but at the expense of incurring a higher computational overhead, i.e., more read and write cycles are required to implement the OSD functions. In fact, the content of the OSD header is illustrative of a particular embodiment and is not limited to the specific arrangement as illustrated in FIG. 2.

The OSD region coordinates 214 contain the positions of the left and right edge of an OSD region, i.e., row start and stop positions and column start and stop positions. For interlaced display, the region coordinates include the positions (pointers) of the top and bottom field pixel bit maps for the corresponding OSD region. Finally, the OSD region coordinates 214 include a pointer to the next header block in the memory.

The palette information 216 contains a plurality of entries where each entry contains a representation of chrominance and luminance levels for an OSD pixel. The palette information 216 is used to program the OSD palette. Since each OSD header contains palette information 216, the available colors can be selectively changed for each OSD header and its associated OSD data bytes. Each palette entry may contain 16 bits of data, i.e., six (6) bits of luminance, Y, four (4) bits of chrominance (color difference signal), $C_b$, and four (4) bits of chrominance (color difference signal), $C_r$. The remaining two bits are used to implement various display options that are irrelevant to the present invention. In one embodiment, there are 16 entries in the palette requiring 4 bits to address each entry.

The function codes (bits) 212 contain information relating to various modes, including but not limited to, display options and OSD bitstream options. In the preferred embodiment, the function bits contain a single bit to indicate whether the "True Color Mode" is enabled.

The OSD data 220 contains bit map data in left to right and top to bottom order. The OSD data is generally used to define the color index of each pixel in the bit map imagery. In the preferred embodiment, if "True Color Mode" is enabled, then the OSD data 220 contains true color pixels (true color format) instead of indices to the palette. In the true color format, the OSD data stream consists of a byte of luminance component (Y) 222, followed by two bytes of chrominance components (color difference signals, $C_b$ 224 and $C_r$ 226), followed by another byte of luminance 228. This pattern is repeated for succeeding pixels as shown in FIG. 2. The length of each byte is generally set at 8 bits, thereby supporting millions of possible color combinations.

For this mode of operation, the OSD unit 150 simply bypasses the OSD palette and passes the true color pixels directly to the mixer 170 as discussed above. Additionally, in order to support "transparent pixels" (where the decoded image from the video decoder is shown rather than the OSD pixels within an OSD region), the Y component is set to all "zeros". This setting causes the mixer 170 to replace the OSD pixel with a corresponding pixel from the decoded image.

Furthermore, the True Color Mode allows a reduction in memory bandwidth requirements by repeating the same chrominance components for the next pixel in the bit map. Namely, a pair of successive pixels share the same chrominance components.

To illustrate, FIG. 2 shows a plurality of data bytes (pixel data) defining pixels, 231–234, where each pixel data structure is 24 bits long (eight bits of Y, eight bits of $C_b$ and eight bits of $C_r$). However, pixels 231 and 232 share the same chrominance components 224 and 226. This pattern is repeated for successive pair of pixels, thereby, effectively, requiring only 16 bits of data to represent a single pixel (two pixels in 32 bits of data).

This mode of operation allows the processor 130 to gain a 33% saving in the amount of data that must be passed to the OSD unit from the memory, i.e., a reduction in the size of the OSD bitstream. More importantly, the number of available colors for each OSD region has been increased dramatically without having to increase the size of the OSD palette. In fact, the increase in hardware requirements, if any, is minimal.

Figure 3:
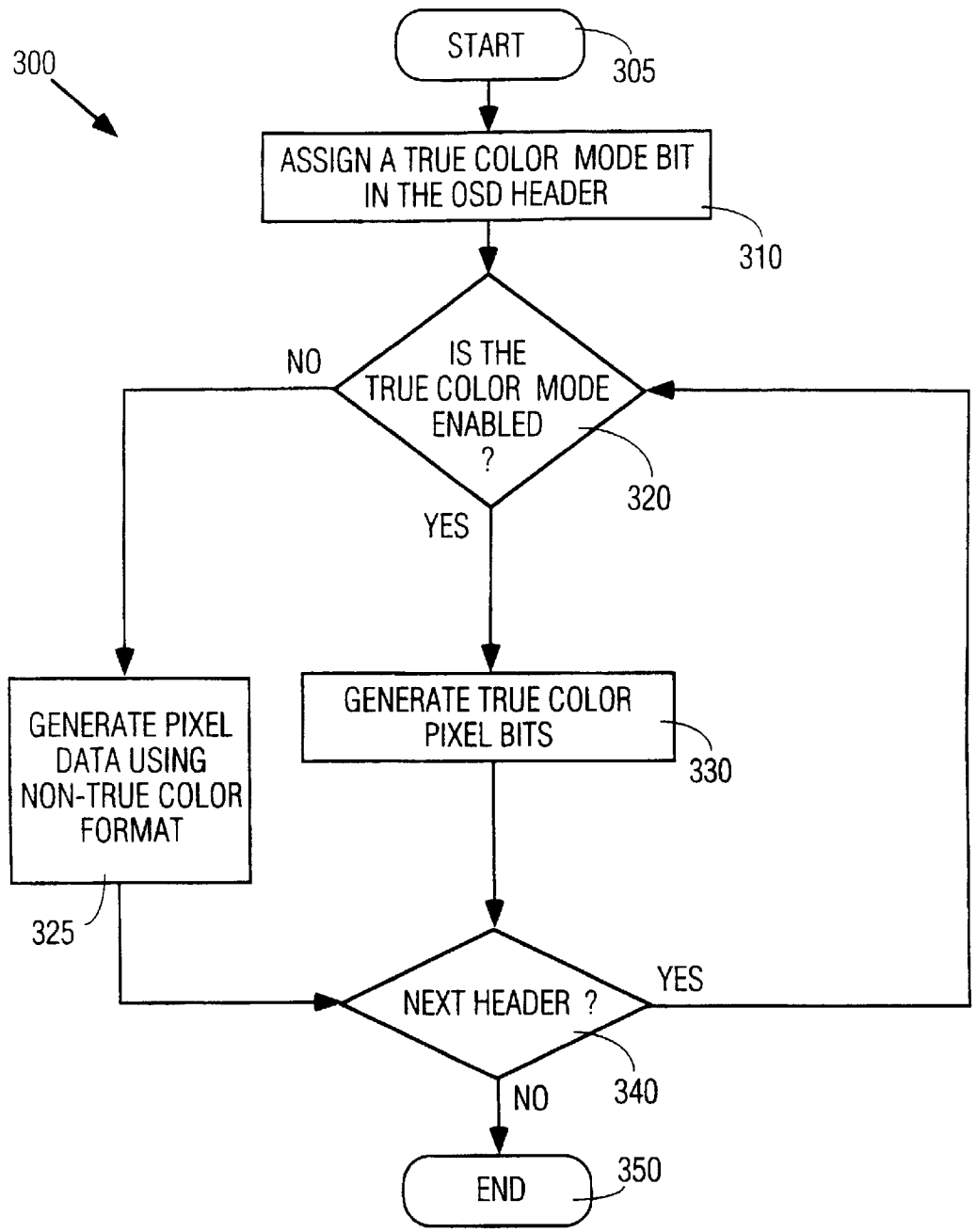
FIG. 3 is a flowchart illustrating the method for constructing a valid OSD bitstream with true color mode.

FIG. 3 illustrates a method 300 for constructing an OSD bitstream with True Color Mode. The method is generally recalled from a storage device, e.g., a memory, and executed by the processor 130. The OSD bitstream is generated by the processor 130 and is processed by the OSD unit 150. Method 300 constructs an OSD bitstream by generating an OSD header having a true color mode bit, followed by a plurality of data bytes of true color pixels.

Referring to FIG. 3, the method 300 begins at step 305 and proceeds to step 310 where a bit in the OSD header is designated as a true color mode bit. If the True Color Mode is enabled in the OSD header, then the OSD data bytes following the header define true color pixels. If the True Color Mode is not enabled, then the OSD data bytes are treated in accordance with a normal format, which may be a 4-bit address to a palette (or any other bitstream formats, e.g., the MPEG standards).

In step 320, method 300 determines whether the True Color Mode is enabled. If the query is negatively answered, method 300 proceeds to step 325 where the OSD data bytes are generated using a non-true color format. Method 300 then proceeds to step 340.

If the query at step 320 is affirmatively answered, method 300 proceeds to step 330 where a plurality of true color pixels is disposed within the OSD data bytes. Each true color pixel comprises three OSD data bytes, where each OSD data byte has a length of 8-bit. Since the chrominance components are repeated for successive pixels (or every other set of chrominance components is discarded), two OSD pixels can be disposed within four OSD data bytes.

In step 340, method 300 determines whether there is another OSD header following the OSD data previously processed. A new OSD header may be required if the various modes represented by the function bits 212 are modified. Similarly, a new header is required for each new OSD region on a frame. If the query is negatively answered, method 300 proceeds to step 350 where method 300 ends. If the query is affirmatively answered, method 300 proceeds to step 320 where the steps of 320–330 are repeated for each additional OSD header. In this manner, the OSD bitstream may comprise both true color OSD data bytes and non-true color OSD data bytes.

There has thus been shown and described a novel method and apparatus for constructing an OSD bitstream defining true color pixels. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. Method of constructing an on-screen display (OSD) bitstream, said method comprising the steps of:

forming a bitstream including an OSD header having a bit for indicating one of a true color mode and a non true color mode; and generating OSD data defining color values of an OSD pixel when the bit indicates said true color mode and a palette address for the OSD pixel when the bit indicates the non true color mode.

2. The method of claim 1, wherein said OSD data defines color values for a plurality of pixels, each of said color values comprising a luminance component and a chrominance component.

3. The method of claim 2, wherein a pair of true color pixels share the same chrominance component.

4. The method of claim 3, wherein said pair of true color pixels comprises two successive true color pixels.

5. The method of claim 4, wherein an arrangement of said pair of true color pixels comprises a first luminance component, followed by said shared chrominance component, followed by a second luminance component.

6. The method of claim 2, wherein said luminance component of a true color pixel is set to all zeros to implement a transparent mode.

7. The method of claim 1, wherein said OSD data generating step is implemented without using a palette.

8. An OSD bitstream stored in a storage medium comprising:

a header having a bit for indicating one of a true color mode and a non true color mode; and a plurality of OSD data bytes, coupled to said header, defining color values of an OSD pixel when the bit indicates said true color mode and a palette address for the OSD pixel when the bit indicates the non true color mode.

9. The OSD bitstream of claim 8, wherein said color value of each of said plurality of OSD data bytes comprise a luminance component and a chrominance component when the bit indicates said true color mode.

10. The OSD bitstream of claim 9, wherein a pair of true color pixels share the same chrominance component.

11. The OSD bitstream of claim 10, wherein said pair of true color pixels comprises two successive true color pixels.

12. The OSD bitstream of claim 11, wherein an arrangement of said pair of true color pixels comprises a first luminance component, followed by said shared chrominance component, followed by a second luminance component.

13. The method of claim 9, wherein said luminance component of a true color pixel is set to all zeros to implement a transparent mode.

14. Apparatus for generating an OSD bitstream comprising:

a storage medium for storing an OSD header having a bit for indicating one of a true color mode and a non true color mode and OSD data coupled to said header, said OSD data defining color values of an OSD pixel when the bit indicates said true color mode and a palette address for the OSD pixel when the bit indicates the non true color mode; and a processor, coupled to said storage medium, for enabling said bit within said header to indicate said true color mode and for reading said OSD header and said OSD data upon enabling of said true color mode bit.

15. The apparatus of claim 14, wherein said storage medium is a read only memory (ROM).

16. The apparatus of claim 14, wherein said storage medium is a random access memory (RAM).

17. Apparatus for generating an OSD message comprising:

a storage medium for storing an OSD bitstream including a header having a bit for indicating one of a true color mode and a non true color mode and OSD data coupled to said header, said OSD data defining color values of a plurality of OSD pixels when the bit indicates said true color mode and a palette address for the plurality of OSD pixels when the bit indicates the non true color mode; and a processor, coupled to said storage medium, for programming said bit within said header to indicate said true color mode and formatting said OSD data to define the color value of each of said plurality of OSD pixels; and an OSD unit, coupled to said processor, for processing said OSD bitstream to form the OSD message.

* * * * *